United States Patent [19]
Schimmer

[11] Patent Number: 5,380,133
[45] Date of Patent: Jan. 10, 1995

[54] DRILL BIT OF THE TWIST DRILL TYPE
[75] Inventor: Walter Schimmer, Munich, Germany
[73] Assignee: Emhart Inc., Newark, Del.
[21] Appl. No.: 182,864
[22] Filed: Jan. 18, 1994
[30] Foreign Application Priority Data
  Jan. 19, 1993 [DE] Germany ................ 4301261
[51] Int. Cl.⁶ .................................. B23B 51/02
[52] U.S. Cl. .......................... 408/199; 408/230
[58] Field of Search ........... 408/210, 227, 229, 230, 408/199

[56] References Cited
U.S. PATENT DOCUMENTS

| | | | |
|---|---|---|---|
| 321,144 | 6/1885 | Soderstrom | 408/210 |
| 815,247 | 3/1906 | Zangerle | 408/230 |
| 4,143,723 | 3/1979 | Schmotzer | 408/230 |
| 4,620,822 | 11/1986 | Hague | 408/230 |

FOREIGN PATENT DOCUMENTS

| | | |
|---|---|---|
| 8014781 | 10/1980 | Germany . |
| 8216775 | 9/1982 | Germany . |
| 3326315 | 6/1984 | Germany . |

*Primary Examiner*—Daniel W. Howell
*Attorney, Agent, or Firm*—E. D. Murphy

[57] ABSTRACT

Drill bit of the twist drill type with turns which are held together by a drill center web and each issue in a radially extending cutting edge of which one extends to the bit axis and the other is shorter than it. This is characterized by the following features:
  a) the cutting edges (2,3) formed by continuos straight edges lie essentially in a plane coinciding with the bit axis (9),
  b) the cutting edges (2,3) form an obtuse angle (cutting angle), lying below 180°, of at least 175°,
  c) the cutting edges (2,3;16) having a leading edge angle (K) of about 30° with a rake angle ($S_1$, $S_{15}$) of about 30° to 45°,
  d) the diameter (D) of the drill center web (6) is at most half the bit diameter.

9 Claims, 3 Drawing Sheets

DRILL BIT OF THE TWIST DRILL TYPE

BACKGROUND OF THE INVENTION

The invention relates to a drill bit of the twist drill type with turns which are held together by a drill centre web and each issue in a radially extending cutting edge of which one extends to the bit axis and the other is shorter than it.

A drill bit of this type is described in DE-OS 30 20 948 (Hertel). The design of the known drill bit has the result that the drill bit may also be produced with smaller diameters.

Drill bits of the type mentioned at the outset may be used for both drilling and counterboring, blind holes which end with a flat base being predominantly produced in the latter case.

The drilling of holes and the subsequent counterboring of an ensuing blind hole represents a procedure which has proven particularly advantageous for the arc welding of aluminium sheets. The welding of two aluminium sheets prepared in this way involves a respective weld-in part made of aluminium for each hole and blind hole which is caused to melt on the base of the blind hole by arc heating and thus joins the two sheets together by means of the molten metal. A process of this type is described, for example, in our U.S. application Ser. No. 07/923,393.

The invention relates to the drilling of a hole and the subsequent counterboring of an ensuing blind hole in two superimposed aluminium sheets using a drill bit such that arc welding can be carried out directly after the drilling and counterboring process without the need for work on the aluminium sheets in preparation for welding.

BRIEF DESCRIPTION OF THE INVENTION

For this purpose a drill bit is used of the kind mentioned above which is characterised according to the invention by the following features:
a) the cutting edges formed by continuous straight edges lie essentially in a plane coinciding with the bit axis,
b) the cutting edges form an obtuse angle (cutting angle), lying below 180°, of at least 175°,
c) the cutting edges have a leading edge angle of about 30° to 45°,
d) the diameter of the drill centre web is at most half the bit diameter.

The arrangement of the cutting edges as continuous straight edges in a plane substantially coinciding with the bit axis ensures that the base of the blind hole produced by the counterboring process has no raised area in its centre which would adversely affect the secure positioning of the weld-in part. The selected obtuse cutting angle of at most 5° ensures that the material of the upper plate is removed completely as the through-hole is being drilled in the upper plate while the drill bit is already penetrating the lower plate to form the blind hole. With similarly designed drill bits having a reflex cutting angle (180° and higher), a plate-like residual part would be drilled from the upper plate as the upper plate is being drilled through by the outer ends of the cutting edges, the residual part considerably complicating counterboring into the lower plate. The design of the cutting edges with respect to their leading edge angle and the rake angle is particularly suitable for the removal of aluminium, in particular at high drill bit speeds which may be, for example, 30,000 rpm for the purpose described here. This results in particularly fine cutting, leading to swarf which may be aspirated without difficulty, cutting being possible without lubricant, coolant or the like owing to the high speed and the selected design of the cutting edges. The points of the two aluminium sheets machined by the drill bit according to the invention are therefore suitable, directly after this machining, for welding by the above-described method which is conditional on a swarf-free and lubricant-free surface. The aspiration of the swarf is simplified in particular if the drilling bit is equipped with a relatively thin drill centre web, namely a drill centre web of which the diameter is at most half of the bit diameter.

The swarf may be discharged in a particularly desirable manner if the drill centre web issues, before each cutting edge, in a flute which passes into the cutting side arm of the rake angle such that the flutes form a core recess next to the internal end of the cutting edge extending to the bit axis. In the internal region of the cutting edges, the two flutes increase the available space in which the swarf can easily flow out and be carried off in a backward direction along the turns of the drill bit.

The above-described design of the drill bit may advantageously be modified in that the turn issuing in the shorter cutting edge with the part allocated to it is removed from the drill centre web. This design, in which only a single cutting edge is provided, provides considerable space for the discharge of the swarf as the swarf may be carried from the single cutting edge not only from its external region in a backward direction but also from its internal a region into the space for the second turn not provided here. The swarf can therefore flow radially outwardly immediately from the internal region of the cutting edge, i.e. the internal region which, for example in conventional twist drills, is particularly critical with respect to the flow of swarf, allows a free discharge of swarf in a particularly desirable manner owing to the space of the missing turn.

The design of the drill bit with a single cutting edge also allows free design of the cutting edge itself, of which the rake angle can also diminish continuously from the exterior inwardly to an angle of 0°. This reduction of the rake angle does not affect the cutting process as the column of material removed is smallest in the internal region of the cutting edge. This design of the cutting edge affords the significant advantage that it may readily be reground, the drill bit being uniformly shortened to a slight extent without the rake angle at each radius of the drill bit altering. During the regrinding of a cutting edge of which the rake angle is the same from the exterior inwardly, this would not be the case. During the regrinding of a cutting edge of this type, the cutting edge would be offset backwardly against the direction of rotation of the drill bit and would therefore go off centre, leading to the production of an undesirable drilled core.

BRIEF DESCRIPTION OF THE DRAWINGS

In order that the invention may be better understood, a preferred embodiment will be described in greater detail by way of example with reference to the accompanying drawings in which.

DETAILED DESCRIPTION OF EMBODIMENT AND DRAWINGS

Figure 1:
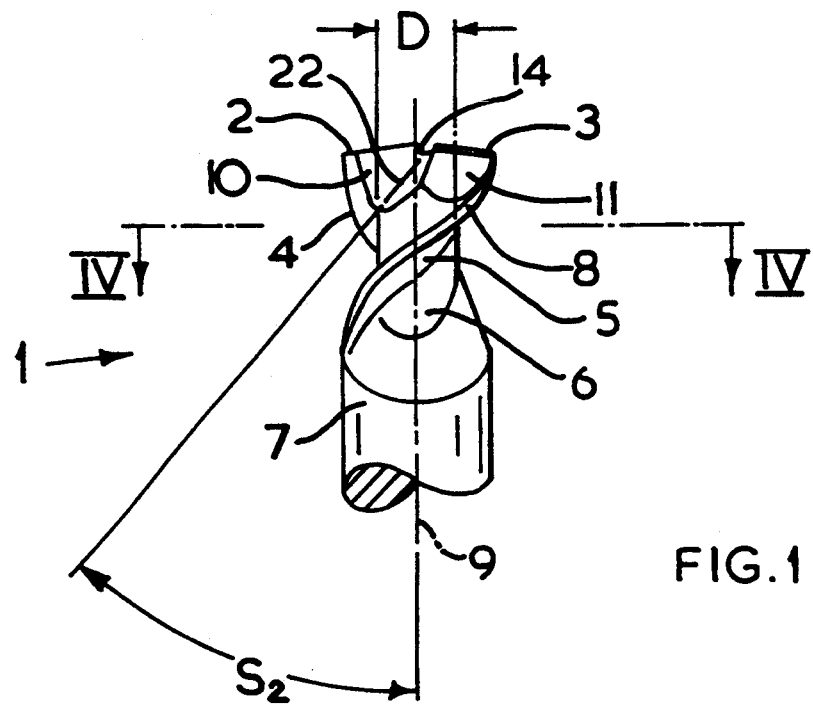
FIG. 1 shows the drill bit with two cutting edges in a side view.

FIG. 1 shows the drill bit (1) with the two cutting edges (2,3). Two turns (4,5), which turn in the manner of a thread round a centre web (6) as in the design of the known twist drill, end in these two cutting edges (2,3). The centre web (6) is cylindrical in design and, together with the turns (4,5), grows axially out of the cylindrical shank (7) of the drill bit. The surface of the shank (7) passes into a respective phase (8) of each turn (4,5) (FIG. 1 only shows phase 8 on turn 5), these phases following the diameter of the cylinder formed by the shank (7) but being slightly bevelled inwardly in the opposite direction to the direction of rotation in order to reduce the friction by the respective phase in a drilled hole.

The two cutting edges (2,3) are each formed by a continuous straight edge, as shown clearly in FIG. 1. They form an angle which is greater than 175° and smaller than 180° (exaggerated in the Figure). They lie in a plane which coincides with the bit axis (9) and coincides with the plane of the drawing in FIG. 1. A slight offset between the two cutting edges (2,3) and this plane such that one respective cutting edge precedes the other in the direction of rotation is insignificant for operation of the drill bit providing that it is only actually quite slight, for example of 0.1 mm. A respective flute (10) (FIG. 1 shows only the flute (10) in the turn (4)) which simplifies swarf removal, is arranged on the side of the turns (4,5), at the front in the direction of rotation, adjacent to the cutting edges (2,3). The flute bottoms (22) form, with the bit axis (9), the angle ($S_2$) which is about 35° to 55°. Undercuts (11) (only undercut (11) on turn 5 being shown in FIG. 1) which serve to reduce friction with the workpiece are also arranged after the cutting edges (2,3) in the direction of rotation. Finally, a narrow free face (12,13) is ground (see FIG. 3) directly after each cutting edge (2,3) in the direction of rotation, the respective cutting edges (2,3) together with the flutes (10) being formed by the narrow free face (12,13).

The flutes (10) which are ground into the turns (4,5) next to the cutting edges (2,3) and run into one another in the region of the point of intersection of the two cutting edges (2,3) produce, immediately next to the internal end of the cutting edge (2) a core recess in the form of a small transverse groove having a depth of one to a few 0.1 mm. This core recess (14) has no effect during counterboring as it is located next to the axis (9) of the drill bit. The cutting edge (2) is in fact longer than the cutting edge (3) and extends at least to the bit axis (9) so that the cutting edge (2) clears away the material opposing it at least to the bit axis (9) in each case during counterboring.

Figure 2:
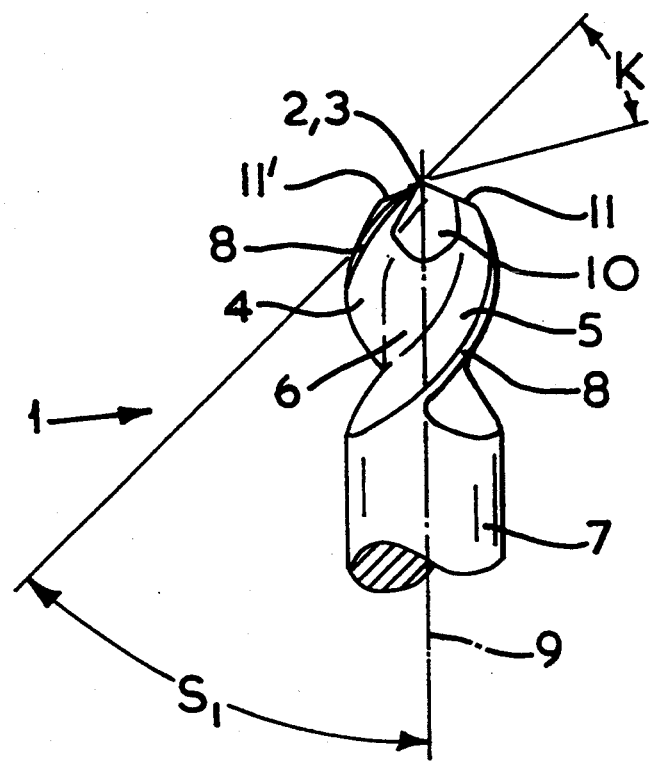
FIG. 2 shows the same drill bit in a side view rotated through 90° relative to the adjustment in FIG. 1.
Figure 3:
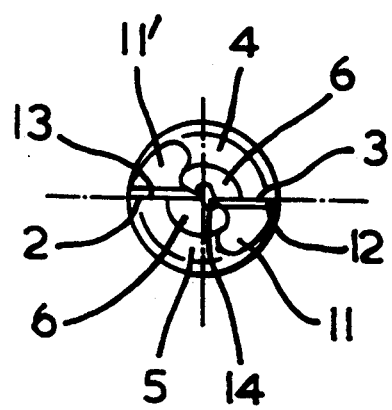
FIG. 3 shows the same drill bit in an axial view of the two cutting edges.

FIGS. 2 and 3 show clearly the cutting edges (2,3) located in the plane of the bit axis (9). FIG. 3 also shows the two free faces (12,13) following the cutting edges (2,3) in the direction of rotation which, together with the flutes (10), form the leading edge angle (K) shown in FIG. 2. This angle is 30° in the embodiment illustrated.

Furthermore, FIG. 2 also shows the rake angle ($S_1$) formed between the bit axis (9) and the faces adjoining the cutting edges (2,3), these faces passing at least in part into the flute (10). This rake angle ($S_1$) is 40° in this case.

FIG. 1 also shows the diameter (D) of the drill centre web (6) which is somewhat smaller than the bit diameter, measured on the shank (7).

Figure 4:
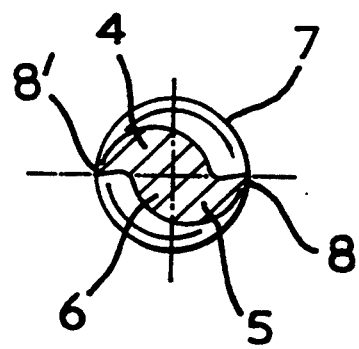
FIG. 4 shows a section through the drill bit according to FIG. 1 along line IV—IV in FIG. 1.
Figure 5:
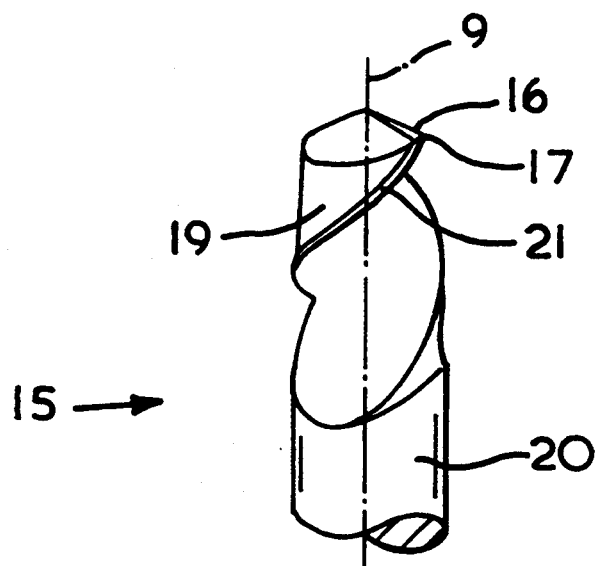
FIG. 5 shows the drill bit with only one cutting edge in a perspective view.

The sectional drawing in FIG. 4 (section along line IV—IV in FIG. 1) shows clearly the radial growth of the turns (4,5) from the cylindrical drill centre web (6).

The drill bit (15) shown in FIGS. 5 to 8 is basically constructed in the same manner as the drill bit (1) according to FIGS. 1 to 4, but the drill bit (15) has only one cutting edge (16). The design of the drill bit (15) may be explained by the fact that, in the drill bit (1), the cutting edge (3) is ground away by the parts beneath it (undercut (11) and a part of the turn (5) and the drill centre web (6)). This is immaterial for the complete cutting process and the counterboring of a blind hole as the remaining cutting edge (16) extends at least to the bit axis (9). The cutting edge (16) is followed by the free face (17) which, together with the face (18) shown in FIG. 6, forms the leading edge angle of the cutting edge (16). The cutting edge (16) is located at the end of the single turn (19) which grows from the shank of the drill bit (15). The part of the turn (19) adjacent to the bit axis (9), the cutting edge (16) therefore entrains all the material to be removed during drilling or counterboring. The cutting edge (16) is followed by the free face (17) which, together with the face (18) shown in FIG. 6, forms the leading edge angle of the cutting edge (16). The cutting edge (16) is located at the end of the single turn (19) which grows from the shank of the drill bit (15). The part of the turn (19) adjacent to the bit axis (9) forms, so to speak, a drill centre web which winds round the axis (9) and therefore allows a particularly large space for the discharge of the swarf. The turn (19) has, at its outer edge, the phase (21) following the diameter of the shank. The turn (19) extends with a face round the bit axis (9), as is the case for example, with a spiral staircase.

Figure 6:
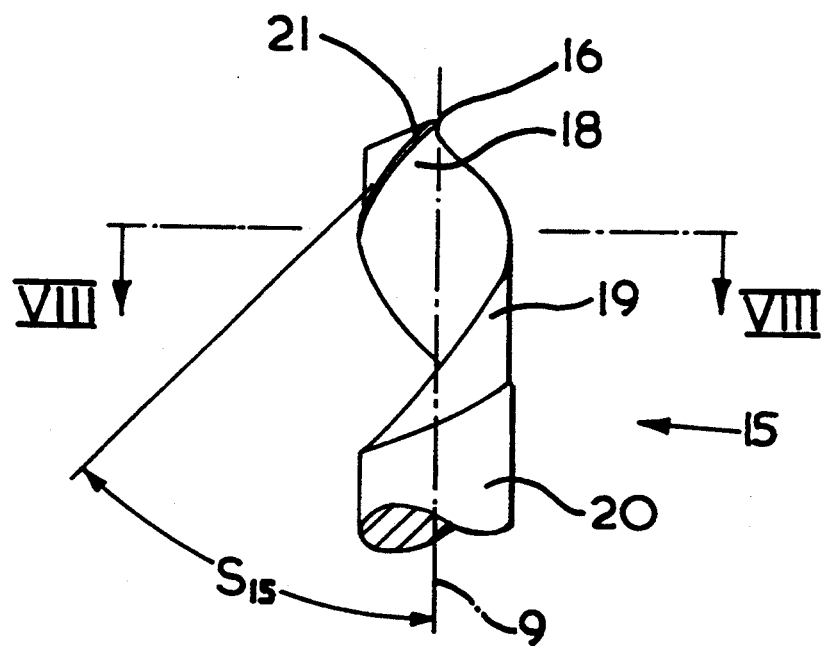
FIG. 6 shows the same drill bit in a side view of the outwardly projecting corner of one cutting edge.
Figure 8:
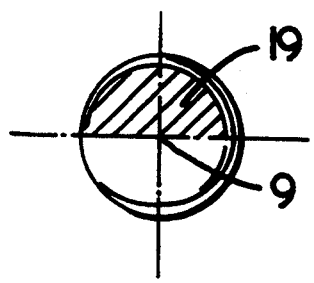
FIG. 8 shows the same drill bit in a section along line VIII—VIII in FIG. 6.
Figure 7:
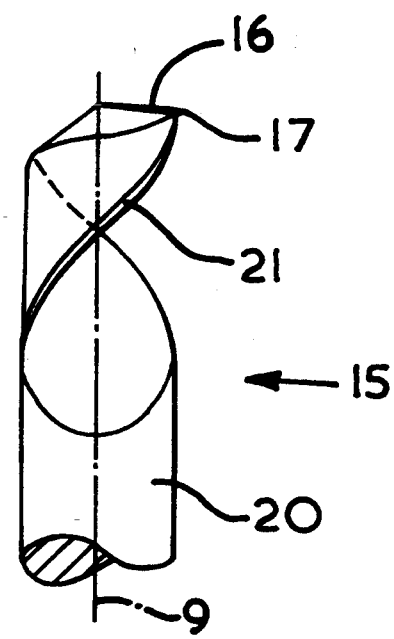
FIG. 7 shows the same drill bit in a side view, rotated through 90° relative to the illustration in FIG. 6.

The cross section shown in FIG. 8 along line VIII—VIII in FIG. 6 shows clearly that the turn (19) which simultaneously forms the drill centre web in its region adjacent to the bit axis (9), has a substantially greater cross section than the corresponding cutting part of drill centre web (6) and turns (4,5) shown in FIG. 4. As a result, the drill bit (15) with a single cutting edge (16) has significantly greater strength and resistance to twist than the drill bit (1). FIG. 8 also shows that the turn (19) constantly approaches the bit axis (9) from its end region in the vicinity of the cutting edge (16) with respect to its external face, preventing the external face of the turn (19) from coming into contact and therefore frictional contact with the wall of the drilled hole.

I claim:

1. A rotary drill bit adapted for high speed drilling of a blind counterbore having a substantially flat to slightly concave floor in a metal workpiece, said bit having a central bit axis and a bit diameter and comprising a shank;

a center web extending from said shank along said bit axis toward a drilling end;

at least one helical turn extending around and along said center web, said turn having a front surface facing in the direction of rotation of said bit and a free face at the end thereof;

said front surface and said free face forming a cutting edge therebetween, said cutting edge having a leading edge angle defined by said front surface and said free face;

said cutting edge being formed in a straight line beginning at said bit axis and extending outwardly therefrom and lying in a common plane with said bit axis, the angle between said cutting edge and said bit axis being from 87.5° to 90°; and the maximum dimension of said center web in a plane perpendicular to said bit axis being less than one-half of said bit diameter.

2. A rotary drill bit as claimed in claim 1 wherein a rake angle is defined between said front surface of said turn and said bit axis, said rake angle lying between 30° and 45°.

3. A rotary drill bit as claimed in claim 1 wherein a flute is provided in the front surface of said turn adjacent said cutting edge, said flute having a base which extends at an angle of from 35° to 55° relative to said bit axis.

4. A rotary drill bit adapted for high speed drilling of a blind counterbore having a substantially flat to slightly concave floor in a metal workpiece, said bit having a central bit axis and a bit diameter and comprising a shank;

a center web extending from said shank along said bit axis toward a drilling end;

a pair of helical turns extending around and along said center web, each turn having a front surface facing in the direction of rotation of said bit and a free face at the end thereof;

said front surface and said free face on each of said turns forming a cutting edge therebetween, said cutting edge having a leading edge angle defined by said front surface and said free face;

each of said cutting edges being formed in a straight line extending outwardly and lying in a common plane with said bit axis, the angle between said cutting edges and said bit axis being from 175° to 180°;

one of said cutting edges extending inwardly to said bit axis; and the maximum dimension of said center web in a plane perpendicular to said bit axis being less than one-half of said bit diameter.

5. A rotary drill bit as claimed in claim 4 wherein a rake angle is defined between said front surface of each of said turns and said bit axis, said rake angle lying between 30° and 45°.

6. A rotary drill bit as claimed in claim 4 wherein said leading edge angle is 30°.

7. A rotary drill bit as claimed in claim 4 wherein a flute is provided in the front surface of each of said turns adjacent said cutting edge, each of said flutes having a base which extends at an angle of from 35° to 55° relative to said bit axis.

8. A rotary drill bit adapted for high speed drilling of a blind counterbore having a substantially flat to slightly concave floor in a metal workpiece, said bit having a central bit axis and a bit diameter and comprising a shank;

a center web extending from said shank along said bit axis toward a drilling end;

at least one helical turn extending around and along said center web, said turn having a front surface facing in the direction of rotation of said bit and a free face at the end thereof;

said front surface and said free face forming a cutting edge therebetween, said cutting edge having a leading edge angle defined by said front surface and said free face;

said cutting edge being formed in a straight line beginning at said bit axis and extending outwardly therefrom and lying in a common plane with said bit axis, the angle between said cutting edge and said bit axis being from 87.5° to 90°;

the maximum dimension of said center web in a plane perpendicular to said bit axis being less than one-half of said bit diameter; and a rake angle being defined between said front surface of said turn and said bit axis, said rake angle lying between 30° and 45° at the exterior edge of said bit and diminishing continuously from the exterior inwardly to an angle of 0°.

9. A rotary drill bit adapted for high speed drilling of a blind counterbore having a substantially flat to slightly concave floor in a metal workpiece, said bit having a central bit axis and a bit diameter and comprising a shank;

a center web extending from said shank along said bit axis toward a drilling end;

at least one helical turn extending around and along said center web, said turn having a front surface facing in the direction of rotation of said bit and a free face at the end thereof;

said front surface and said free face forming a cutting edge therebetween, said cutting edge having a leading edge angle of 30° defined by said front surface and said free face;

said cutting edge being formed in a straight line beginning at said bit axis and extending outwardly therefrom and lying in a common plane with said bit axis, the angle between said cutting edge and said bit axis being from 87.5° to 90°; and the maximum dimension of said center web in a plane perpendicular to said bit axis being less than one-half of said bit diameter.

* * * * *